(12) United States Patent
Bando et al.

(10) Patent No.: US 12,257,748 B2
(45) Date of Patent: Mar. 25, 2025

(54) METHOD FOR MANUFACTURING COMPOSITE MOLDED ARTICLE AND COMPOSITE MOLDED ARTICLE

(71) Applicant: VUTEQ CORPORATION, Toyota (JP)

(72) Inventors: Takashi Bando, Toyota (JP); Hiroshi Kito, Toyota (JP); Kazuto Sawada, Toyota (JP); Batbaatar Liijiijamba, Toyota-shl (JP)

(73) Assignee: VUTEQ CORPORATION, Toyota (JP)

( * ) Notice: Subject to any disclaimer, the term of this patent is extended or adjusted under 35 U.S.C. 154(b) by 298 days.

(21) Appl. No.: 17/793,392

(22) PCT Filed: Feb. 16, 2021

(86) PCT No.: PCT/JP2021/005585
§ 371 (c)(1),
(2) Date: Jul. 16, 2022

(87) PCT Pub. No.: WO2021/166866
PCT Pub. Date: Aug. 26, 2021

(65) Prior Publication Data
US 2023/0054242 A1    Feb. 23, 2023

(30) Foreign Application Priority Data

Feb. 21, 2020   (JP) .................. 2020-027771

(51) Int. Cl.
*B29C 45/14*     (2006.01)
*B29C 45/26*     (2006.01)

(52) U.S. Cl.
CPC .... *B29C 45/1418* (2013.01); *B29C 45/14008* (2013.01); *B29C 45/26* (2013.01)

(58) Field of Classification Search
CPC .......... B29C 45/1418; B29C 45/14008; B29C 45/26
(Continued)

(56) References Cited

U.S. PATENT DOCUMENTS

2005/0023725 A1    2/2005  Cesano
2005/0064141 A1*   3/2005  Flaig ....................... B32B 37/00
                                                    428/141
(Continued)

FOREIGN PATENT DOCUMENTS

JP   1999-314554 A    11/1999
JP   2006-159872 A    6/2006
(Continued)

OTHER PUBLICATIONS

JP 2017-065025 A—an English translation. (Year: 2017).*
Apanese Office Action of Jul. 4, 2023 for JP2020-027771, Citing US20050023725.

*Primary Examiner* — Betelhem Shewareged
(74) *Attorney, Agent, or Firm* — Yoshida and Associates LLC; Kenichiro Yoshida

(57) ABSTRACT

A composite molded article is manufactured in such a manner that a molding mold that forms a molding space by mold closing and has a weir portion projecting into the molding space is opened, a flat plate-like first member that is softened under heating is arranged in a part of a portion where the molding space is formed, the stereoscopic first molded portion is formed with mold closing, simultaneously an injected molten resin is filled in a remaining portion of the molding space around the first member outside the weir portion in a state that the weir portion is made to abut against a thin portion provided at a peripheral edge of the first molded portion, and the second molding portion joined to the first molding portion is formed by hardening molten (Continued)

resin after the resin is caused to contact the first molded portion.

4 Claims, 11 Drawing Sheets

(58) Field of Classification Search
USPC .......................................................... 428/192
See application file for complete search history.

(56) References Cited

U.S. PATENT DOCUMENTS

| | | | |
|---|---|---|---|
| 2006/0019099 A1* | 1/2006 | Wang | B32B 27/08 428/412 |
| 2018/0186052 A1* | 7/2018 | Van Der Linde | B29C 45/14196 |
| 2023/0054242 A1* | 2/2023 | Bando | B29C 45/1418 |

FOREIGN PATENT DOCUMENTS

| | | | |
|---|---|---|---|
| JP | 2009-006610 A | 1/2009 | |
| JP | 2012-111371 A | 6/2012 | |
| JP | 2017-065025 A | 4/2017 | |
| JP | 2019-142078 A | 8/2019 | |
| WO | WO-2017110815 A1 * | 6/2017 | ............ A61M 37/00 |

* cited by examiner

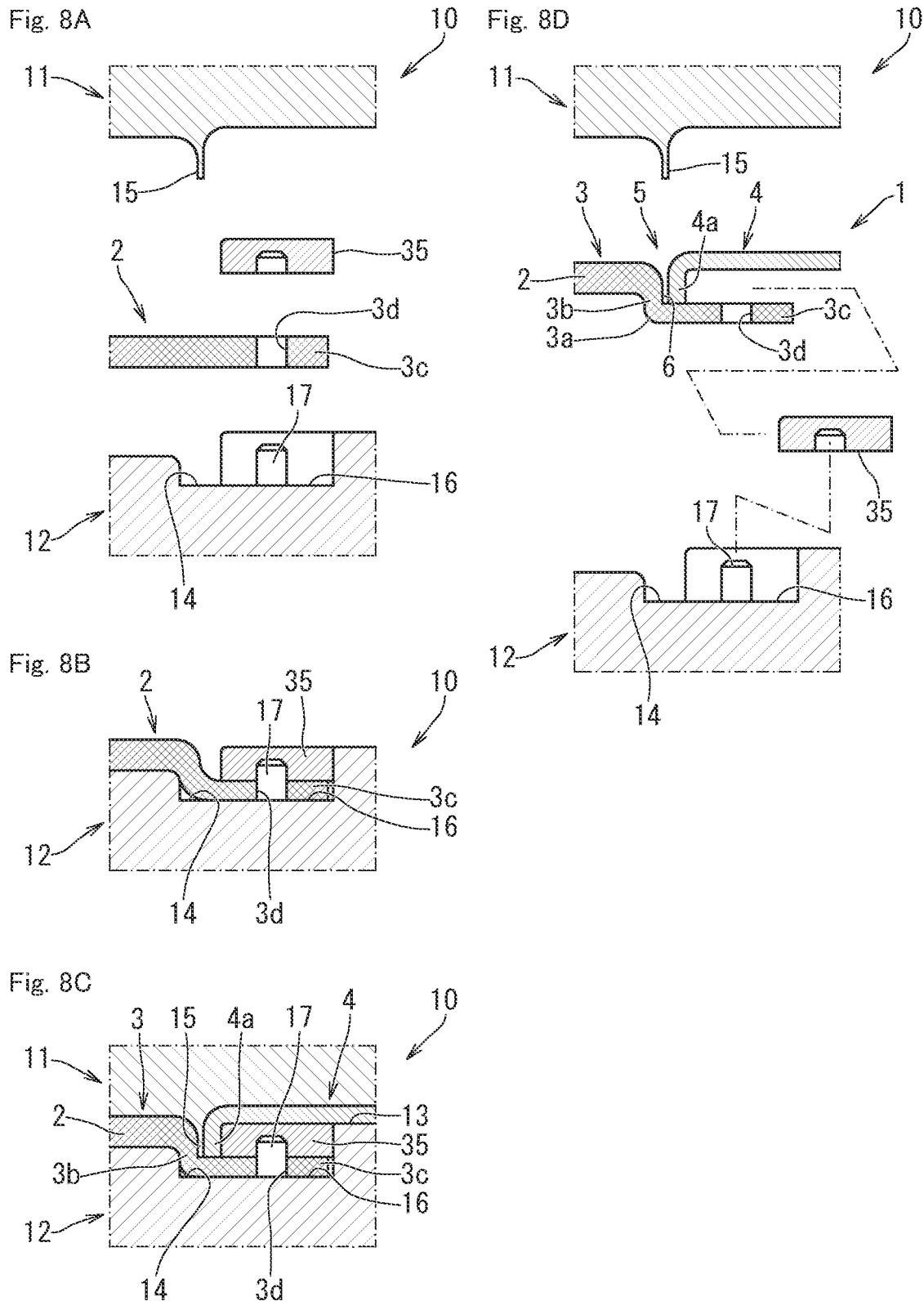

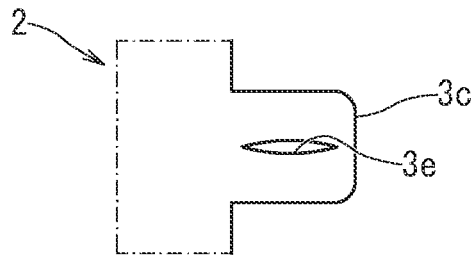
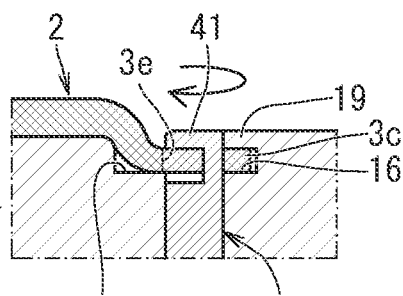
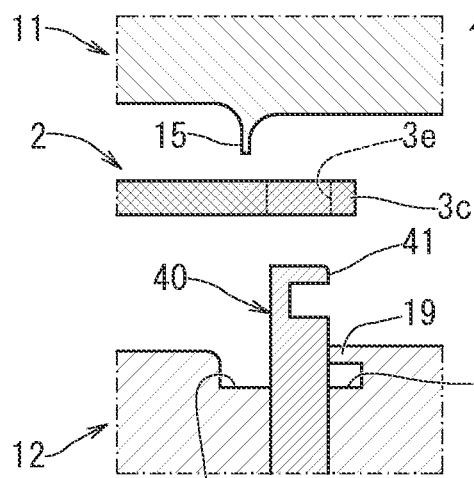
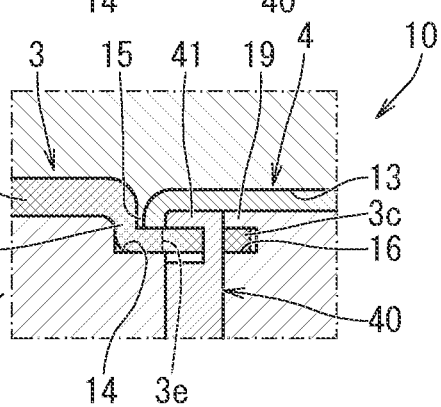
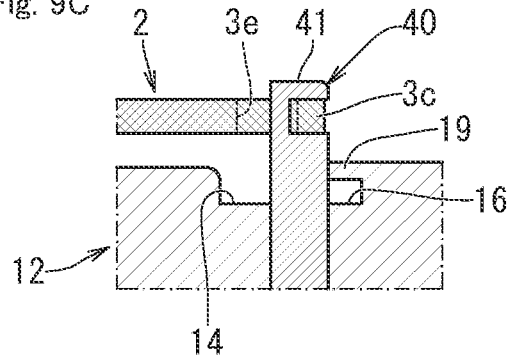
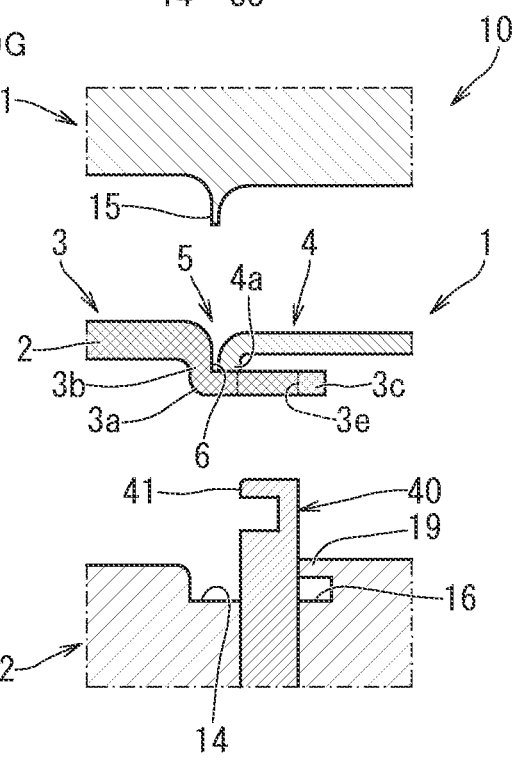
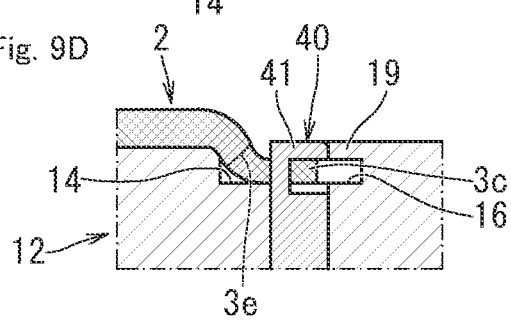

METHOD FOR MANUFACTURING COMPOSITE MOLDED ARTICLE AND COMPOSITE MOLDED ARTICLE

BACKGROUND OF THE INVENTION

Field of the Invention

The present invention relates to a method for manufacturing a composite molded article provided by integrally molding different materials and the composite molded article.

Description of the Related Art

An interior material for a vehicle, such as a door trim, the decorativeness of which is improved by forming a grained groove in an interior material main body and fitting and mounting a peripheral edge portion of a skin material such as a nonwoven fabric into the grained groove has been proposed (Patent Document 1). A technology in Patent Document 1 involves providing insertion holes in a bottom portion of the grained groove of the interior material main body, providing, on the skin material, extension portions that are inserted through the insertion holes, and mounting the extension portions inserted through the through-holes and projecting to the back side of the interior material main body on a back surface of the interior material main body.

With the technology in Patent Document 1, an operator however inserts the extension portions of the skin material through the insertion holes of the grained groove, and then, mounts the extension portions on the back side of the interior material main body. Since the plurality of extension portions and insertion holes are provided along the grained groove, the operator needs to perform a mounting operation for each of the extension portions. This requires troublesome tasks and time, resulting in the problem that cost is increased. Furthermore, the technology in Patent Document 1 has the problem that the interior material is heavy because the interior material main body is present also on the back side of the skin material.

On the other hand, a method in which a skin material the outer periphery of which has been previously molded and trimmed in another process is set in a molding mold and a back surface of the skin material is also filled with molten resin for integral molding (so-called insert molding) has been known as a method for an interior material for a vehicle. However, the skin material is thermally damaged by heat of the molten resin injected onto the back surface of the skin material in such insert molding. The problem therefore arises that a material to be used for the skin material is limited to that having heat resistance so as to prevent it from being thermally damaged.

To cope with the above problems, an article provided by integrally molding a multilayered structure with a skin material covered on the surface thereof and a resin single product has been proposed (Patent Document 2). The technology in Patent Document 2 involves setting, in an injection mold, of a structure provided by bonding the skin material onto the surface of a foamed resin sheet with a heat insulating layer interposed therebetween and injection molding on the back surface of the foamed resin sheet, and injection molding of the resin single product. This configuration tries to avoid thermal damage on the skin material due to injection of the molten resin on the back surface by the heat insulating layer.

However, the above-described insert molding and the technology in Patent Document 2 fails to achieve sufficient reduction in weight due to presence of the resin because the resin is provided on the back surface of the skin material. In addition, for example, in the case where the foamed resin sheet or the skin material is replaced by a nonwoven fabric in the above-described insert molding or the technology in Patent Document 2, when the molten resin is injected onto the back surface of the nonwoven fabric, the molten resin leaks out to the surface through the nonwoven fabric by an injection pressure thereof, resulting in deterioration in outer appearance.

Patent Document 1: Japanese Patent Application Laid-open No. 2012-111371
Patent Document 2: Japanese Patent Application Laid-open No. 2006-159872

SUMMARY OF THE INVENTION

In view of the above-described circumferences, an object of the present invention is to provide a method for manufacturing a composite molded article reduced in weight and having high decorativeness while suppressing increase in cost, and the composite molded article.

In order to achieve the above-described object, a method for manufacturing a composite molded article according to an aspect of the present invention is "a method for manufacturing a composite molded article in which a first molded portion formed by a flat plate-like first member which is softened under heating and a second molded portion formed by hardening molten resin are integrally molded, the method comprising:

opening a molding mold that forms a molding space by the mold closing and has a weir portion projecting into the molding space, arranging the flat plate-like first member softened under heating in a part of a portion where the molding space is formed, forming the first molded portion that is stereoscopic with mold closing, simultaneously filling an injected molten resin in a remaining portion of the molding space around the first member outside the weir portion in a state that the weir portion is made to abut against a thin portion reduced in thickness and provided at a peripheral edge of the first molded portion, and forming the second molded portion that is joined to the first molded portion by hardening molten resin after the resin is caused to contact the first molded portion.

Examples of the "first member" which is softened under heating can include a nonwoven fabric containing thermoplastic fiber, a nonwoven fabric impregnated with thermoplastic resin, foamed resin such as urethan foam, and the above-described nonwoven fabric or foamed resin having a surface to which a resin sheet with a woodgrain pattern or a leather pattern applied is bonded.

The "thin portion" may be formed to have a constant width from the peripheral end side of the first molded portion or may be formed into a groove shape in a portion with a constant distance to the inner side of the first molded portion from the peripheral end side of the first molded portion. The "thin portion" may be formed by the weir portion of the molding mold or may be previously formed on the first member.

The molten resin may be injected during the mold closing of the molding mold or after the molding mold is completely closed.

The method for manufacturing the composite molded article with this configuration can mold the flat plate-like first member into the stereoscopic first molded portion by arranging the first member softened under heating in a part of the portion of the opened molding mold where the molding space is formed and the molding mold is closed. Furthermore, simultaneously with molding of the first molded portion, the molten resin injected to the remaining portion of the molding space formed around the first molded portion (first member) flows in the molding space and makes contact with the peripheral edge of the first molded portion. In this case, the thin portion formed by compressing the first member is formed and a density is increased at the peripheral edge of the first molded portion, and the weir portion of the molding mold abuts against the thin portion. The molten resin and heat of the molten resin is not therefore transferred to the inner side of the first molded portion beyond the thin portion and the weir portion. When the molten resin filling the portion of the molding space outside the weir portion is cooled to be hardened, the second molded portion is formed. In such a manner, the composite molded article including the first molded portion and the second molded portion that are integrally molded is manufactured.

As described above, with this configuration, the first molded portion formed by the first member which is softened under heating and the second molded portion made of resin which is molten are integrally molded simultaneously in one molding mold. An operator is not therefore required to assemble the first molded portion and the second molded portion that are separately molded. Accordingly, time taken for manufacturing can be shortened, and increase in manufacturing cost can be suppressed.

Moreover, with this configuration, the thin portion and the weir portion can prevent the molten resin and the heat of the molten resin from influencing the first molded portion. This can avoid deterioration in outer appearance, which is caused by the resin of the second molded portion that appears on the surface of the first molded portion or change of the first molded portion due to the heat of the molten resin. The composite molded article with high decorativeness can thereby be manufactured.

Furthermore, with this configuration, the second molded portion is joined in the portion in contact with the first molded portion, so that the first molded portion and the second molded portion are joined over the entire length of the contact portion. The first molded portion and the second molded portion can thereby be firmly joined in comparison with the case where the skin material is mounted on the interior material main body at places by the extension portions as in Patent Document 1, thereby manufacturing the composite molded article with high strength and rigidity.

Additionally, with this configuration, the first molded portion is formed by the first member softened under heating with mold closing, and the second molded portion is formed by hardening the molten resin. The hardening of the molten resin takes time and the second molded portion is formed later than the first molded portion because the temperature of the molten resin is higher than the temperature of the first member that is not liquefied. Compression stress therefore acts from the surrounding on the first molded portion formed first with contraction of the second molded portion by hardening of the molten resin, so that residual stress is generated on the first molded portion. Therefore, even when an external force acts on the composite molded article, the residual stress of the first molded portion can cancel such force to some extent, thereby manufacturing the composite molded article that is hardly damaged.

Furthermore, with this configuration, the molten resin is injected to the surrounding of the first molded portion to mold the second molded portion, and the second molded portion is not present on the back surface of the first molded portion. Accordingly, as compared to a conventional article in which resin is present on the back surface of a skin material or a decorative material corresponding to the first member, the composite molded article further reduced in weight can be manufactured, and the amount of resin to be used can be reduced for the size of the composite molded article to suppress increase in cost for manufacturing the composite molded article.

In the method for manufacturing the composite molded article in the aspect of the present invention, in addition to the above-described configuration, "the molding mold includes a front mold for forming a front surface of the composite molded article and a back mold for forming a back surface of the composite molded article, the first member has a plurality of tabs extending to a region where the second molded portion is formed, and mold closing is performed in a state where the tabs are positioned to the back mold such that a part of the molding space is formed between the tabs and the front mold."

A position of the first member arranged in the molding mold can deviate in manufacturing of the composite molded article. When the first molded portion of the composite molded article has a mounting hole or an opening for mounting another component, the first member can be positioned to the molding mold utilizing the mounting hole or the like. It is however difficult to position the first member to the molding mold when the first molded portion has no mounting hole and no opening.

With this configuration, the plurality of tabs are provided on the first member, and the tabs are positioned to the back mold. The first member can therefore be positioned to the molding mold with the plurality of tabs reliably. Furthermore, the tabs extending to the second molded portion are positioned to the back mold, and a part of the molding space is formed between the tabs and the front mold. Accordingly, the molding space is filled with the molten resin to prevent the tabs from appearing on the surface of the second molded portion, and the outer appearance of the composite molded article is not deteriorated.

A composite molded article according to another aspect of the present invention "comprises:

a first molded portion that has a thin portion reduced in thickness at a peripheral edge and is stereoscopically formed by a first member which is softened under heating, and a second molded portion that is joined to the first molded portion on an outer side of the thin portion, is provided around the first molded portion, and is formed by hardening molten resin."

The composite molded article having this configuration can provided similar action and effects to those by the composite molded article manufactured by the above-described method for manufacturing the composite molded article.

As described above, the method for manufacturing the composite molded article reduced in weight and having high decorativeness while suppressing increase in cost, and the composite molded article can be provided as effects of the present invention.

BRIEF DESCRIPTION OF THE DRAWINGS

FIGS. 8A to 8D are descriptive views illustrating positioning of the tabs in a further different form together with the manufacturing process.

FIG. 9A is a descriptive view illustrating the tab in a different form from that in FIGS. 1A to 1D, and FIGS. 9B to 9G are descriptive views illustrating positioning of the tabs in FIG. 9A together with the manufacturing process.

DESCRIPTION OF THE EMBODIMENTS

Figure 1A:
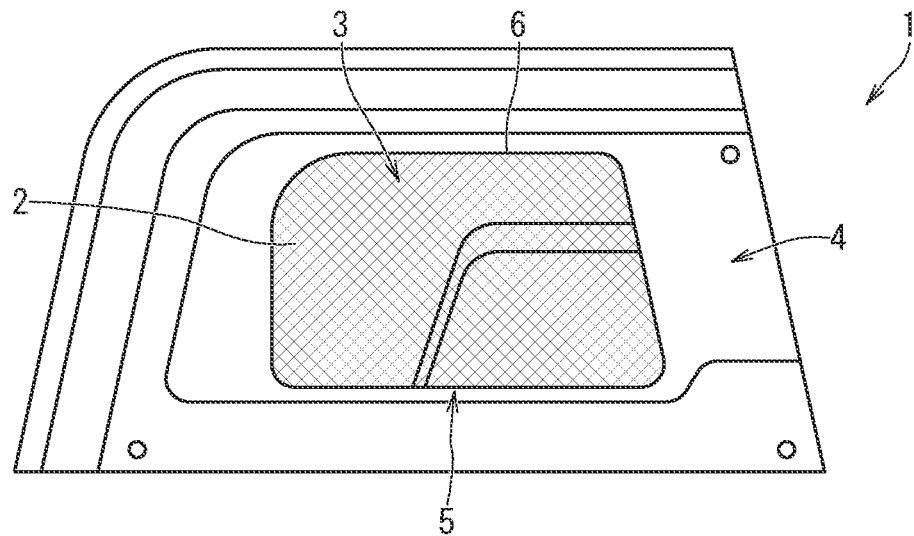
FIG. 1A is a descriptive view schematically illustrating an overall composite molded article as an embodiment of the present invention.
Figure 1B:
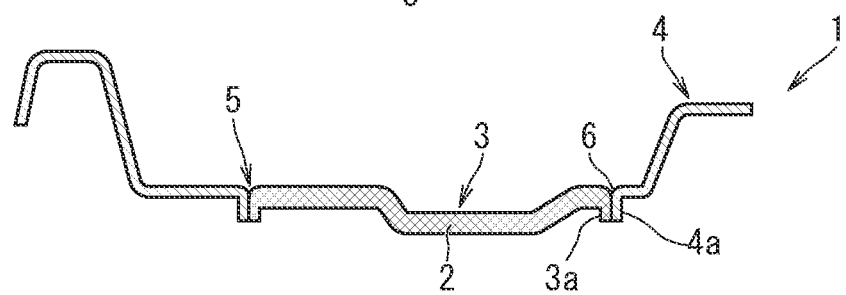
FIG. 1B is a cross-sectional view of the composite molded article.
Figure 1C:
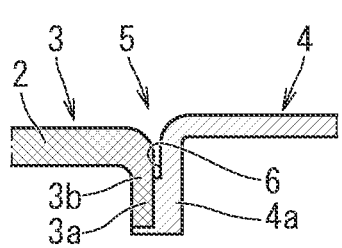
FIG. 1C is an enlarged cross-sectional view of a joining portion between a first molded portion and a second molded portion in the composite molded article.

Hereinafter, a composite molded article 1 as a specific embodiment of the present invention will be described in detail with reference to the drawings. The composite molded article 1 in the embodiment is used as an interior material for a building, a vehicle, or the like. Herein, a surface that can be externally viewed is referred to as a front surface and an opposite surface thereto is referred to as a back surface when the composite molded article 1 is mounted on a mounting target.

As illustrated in FIGS. 1, the composite molded article 1 includes a first molded portion 3 formed by a flat plate-like first member 2 which is softened under heating and a second molded portion 4 formed by hardening molten resin. The composite molded article 1 includes the second molded portion 4 provided so as to surround the first molded portion 3. Each of the first molded portion 3 and the second molded portion 4 has a plate-like shape having a constant thickness and is stereoscopically formed. The first molded portion 3 and the second molded portion 4 are integrally joined in a joining portion 5 where they are in contact with each other.

In the composite molded article 1 in the embodiment, the first member 2 forming the first molded portion 3 is a flat plate-like nonwoven fabric which is softened under heating and contains thermoplastic fiber such as polypropylene, polyester, polyethylene, polyethylene terephthalate (PET), and nylon. The second molded portion 4 is made of thermoplastic synthetic resin such as polypropylene.

The first molded portion 3 and the second molded portion 4 respectively have a first joining piece 3a and a second joining piece 4a that are bent to the back surface side in the joining portion 5, and are joined in a state where portions thereof from halfway points of the first joining piece 3a and the second joining portion 4a to the front ends thereof are in contact with each other. The synthetic resin forming the second molded portion 4 permeates the first molded portion 3 made of the nonwoven fabric in the joining portion 5, so that the first molded portion 3 and the second molded portion 4 firmly adhere to each other.

The first joining piece 3a and the second joining piece 4a are separated from each other from the front surface to the joined portion, and a groove 6 is formed between the first joining piece 3a and the second joining piece 4a. That is to say, the first molded portion 3 and the second molded portion 4 are joined to each other at a site deeper than (farther from the front surfaces thereof than) the bottom of the groove 6. The groove 6 extends over the entire length of the peripheral edge of the first molded portion 3. The composite molded article 1 thereby has such outer appearance that the peripheral edge of the first molded portion 3 is fitted into a grained groove.

The first molded portion 3 has a thin portion 3b reduced in thickness at a peripheral edge thereof. As is described in detail, the thin portion 3b is provided at a root portion of the first joining piece 3a, which is bent to the back surface side and extends in an axial line direction coupling the front surface and the back surface thereof. The thin portion 3b is formed by compressing the first member 2 and has a higher density than that of the other portions. The first molded portion 3 is joined to the second joining piece 4a of the second molded portion 4 in a portion of the first joining piece 3a on the outer side of the thin portion 3b (see FIG. 10).

The first molded portion 3 has flat plate-like tabs 3c extending to the back surface of the second molded portion 4 from the front end of the first joining piece 3a and through-holes 3d penetrating through the tabs 3c. The plurality of tabs 3c are provided with intervals along the peripheral edge and respectively have the through-holes 3d provided in a circularly punched form (see FIG. 2). The tabs 3c are bent to the back surface of the second molded portion 4 from the first joining piece 3a at the bottom portion of the groove 6.

Figure 5A:
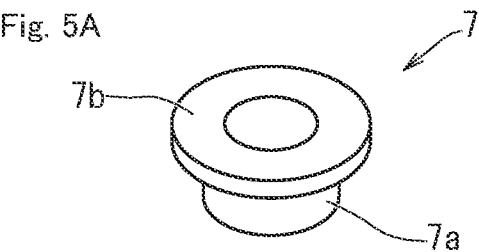
FIG. 5A is a perspective view illustrating a positioning bush.
Figure 5B:
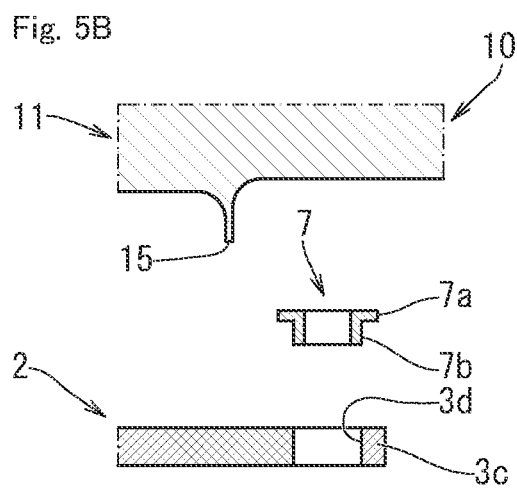
FIGS. 5B to 5E are descriptive views illustrating positioning with the tab in the joining portion between the first molded portion and the second molded portion in the manufacturing process in FIGS. 3A to 3C in an enlarged manner.
Figure 5C:
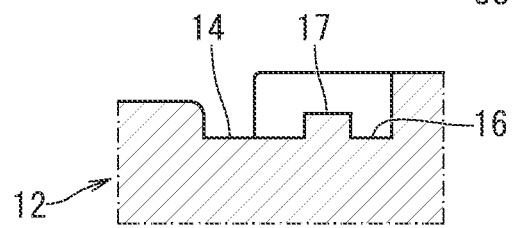
Figure 5D:
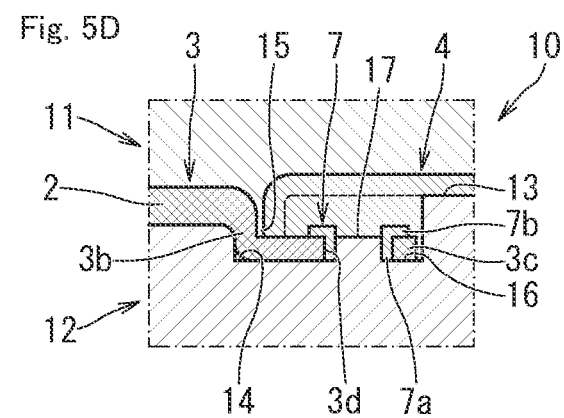
Figure 5E:
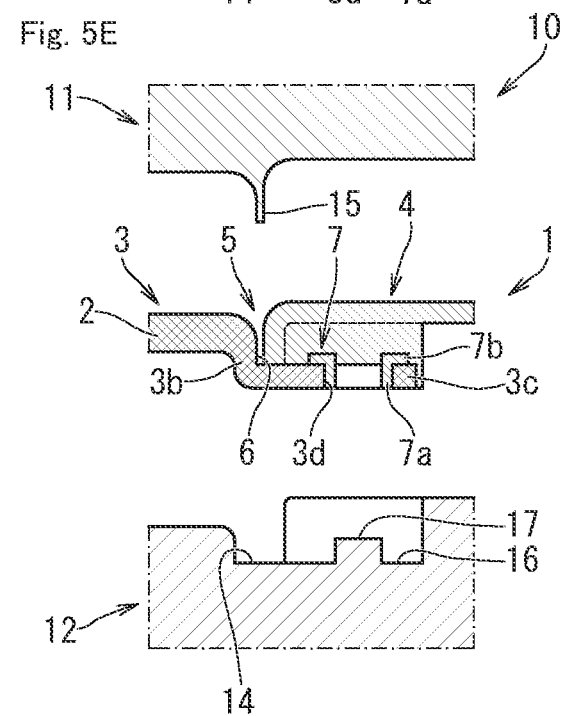

Positioning bushes 7 are fitted into the through-holes 3d of the tabs 3c. Each of the positioning bushes 7 has a cylindrical portion 7a having a circular cylinder shape and a flange portion 7b extending outward on one end portion of the cylindrical portion 7a in the axial direction (see FIG. 5A). The positioning bushes 7 are fitted into the through-holes 3d in a state where the flange portions 7b abut against the surfaces of the tabs 3c. The positioning bushes 7 in the embodiment are made of synthetic resin.

Figure 1D:
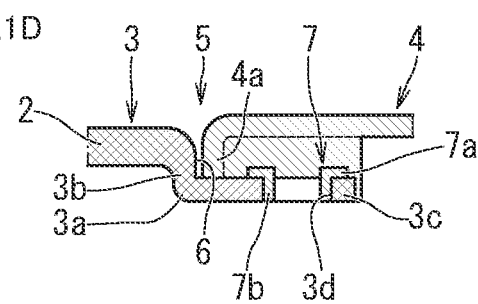
FIG. 1D is an enlarged cross-sectional view of a site of a tab in the joining portion between the first molded portion and the second molded portion in the composite molded article.

The tabs 3c and the positioning bushes 7 are joined to the second molded portion 4 in a state where the surfaces thereof are in contact with the back surface of the second molded portion 4 (see FIG. 1D). The tabs 3c and the positioning bushes 7 are not thereby seen from the front surface side. Furthermore, the positioning bushes 7 are not detached to the back side through the through-holes 3d. As illustrated in the drawings, the first molded portion 3 is formed such that the thicknesses of the first joining piece 3a and the tabs 3c are smaller than that of the other portions by compression.

As described above, the second molded portion 4 is provided so as to surround the first molded portion 3 and is made of the synthetic resin. Although not illustrated in the drawings, a reinforcing rib may be integrally provided on the back surface of the second molded portion 4.

Figure 3A:
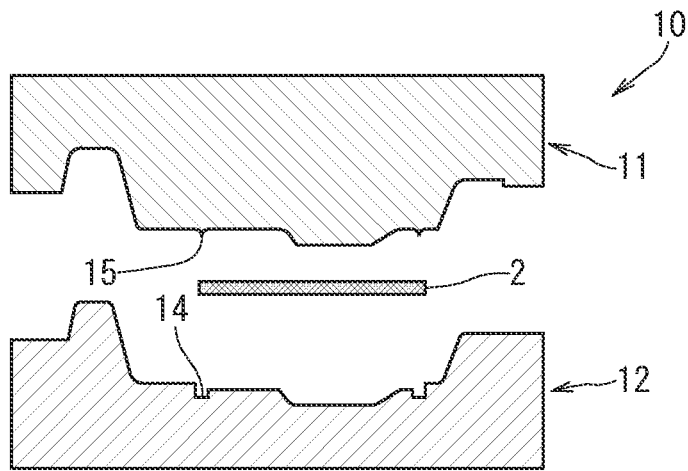
FIGS. 3A to 3C are descriptive views schematically illustrating a manufacturing process of the composite molded article in FIGS. 1A to 1D.
Figure 3B:
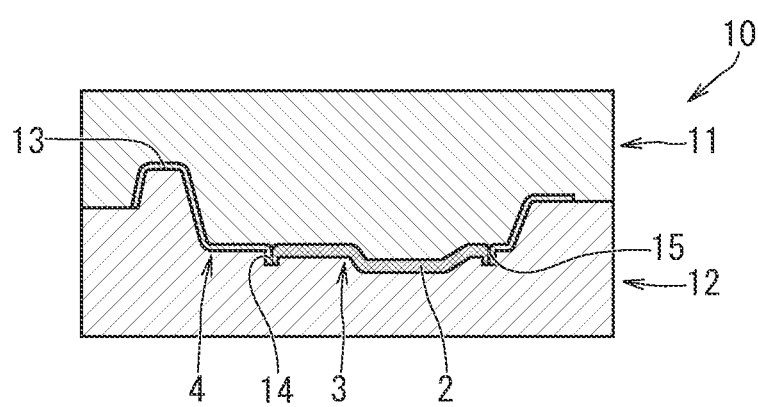
Figure 3C:
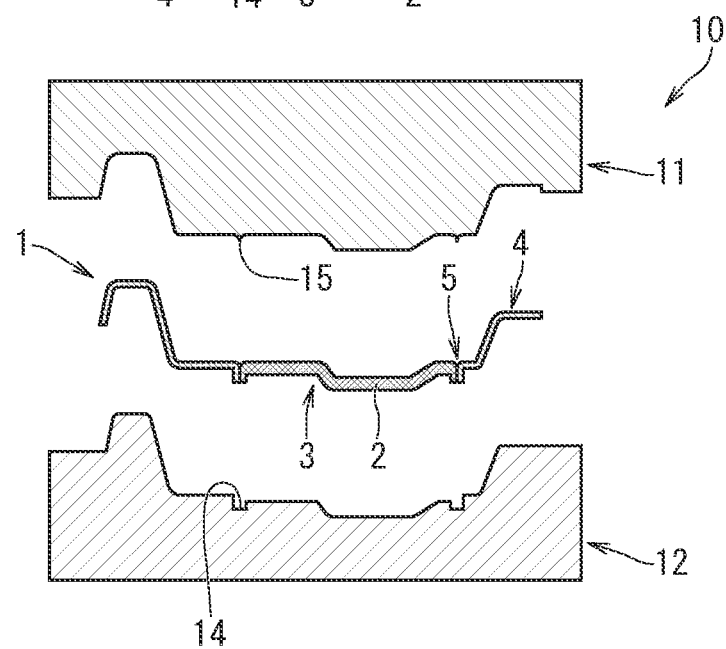
Figure 4A:
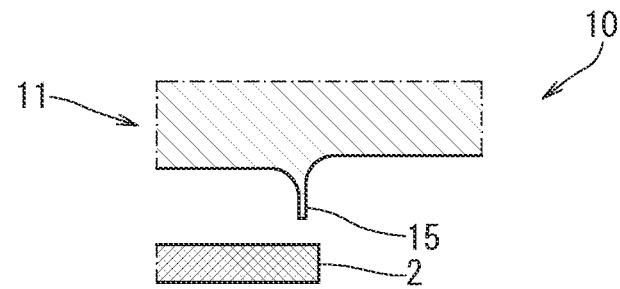
FIG. 4A to 4C are descriptive views illustrating a site of the joining portion between the first molded portion and the second molded portion in the manufacturing process in FIGS. 3A to 3C in an enlarged manner.
Figure 4B:
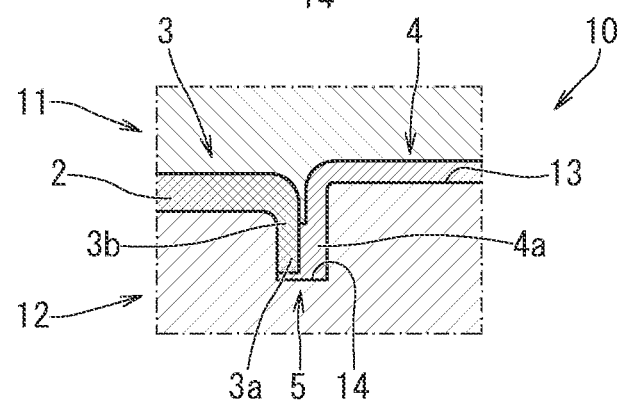
Figure 4C:
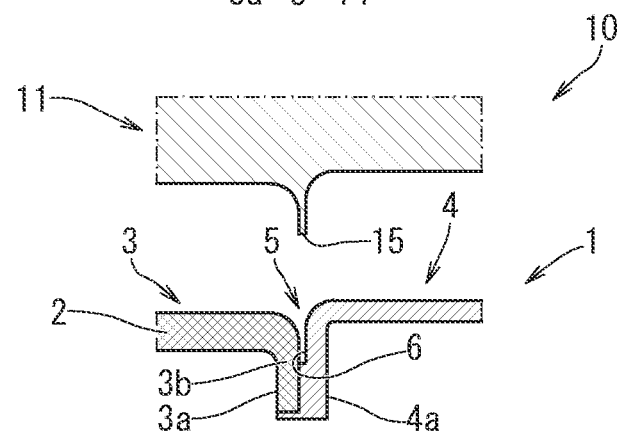

Next, a method for manufacturing the composite molded article 1 will be described. The composite molded article 1 is manufactured using a molding mold 10 as illustrated in FIGS. 3A to 3C and the like. The molding mold 10 is configured by a front mold 11 for forming the front surface of a product and a back mold 12 for forming the back surface thereof. The molding mold 10 forms a molding space 13 for forming the composite molded article 1 by mold closing. In the embodiment, the front mold 11 is an upper mold whereas the back mold 12 is a lower mold.

A joining portion formation groove 14 is formed in a portion of the back mold 12 of the molding mold 10, which corresponds to the peripheral edge of the first molded portion 3. A weir portion 15 projecting so as to be inserted into the joining portion formation groove 14 of the back mold 12 is formed on the front mold 11. In the embodiment, the joining portion formation groove 14 and the weir portion 15 are provided in annular forms.

The back mold 12 includes tab accommodation grooves 16 extending outward from the joining portion formation groove 14 and positioning pins 17 projecting upward from bottom portions of the tab accommodation grooves 16 (see FIGS. 5B to 5E). The tab accommodation grooves 16 are formed to have such sizes that they can accommodate the tabs 3c of the first molded portion 3. The plurality of tab accommodation grooves 16 and positioning pins 17 are provided with intervals along the joining portion formation groove 14. The depths of the tab accommodation grooves 16 may be the same as, shallower than, or deeper than the depth of the joining portion formation groove 14.

Although not illustrated in the drawings, the molding mold 10 (back mold 12) includes a gate for injecting (discharging) the molten resin into the molding space 13 on the outer side of the joining portion formation groove 14 in the portion where the molding space 13 is formed. The molding mold 10 is used at a predetermined temperature (for example, 35° C. to 45° C.) when the composite molded article 1 is molded.

Figure 2:
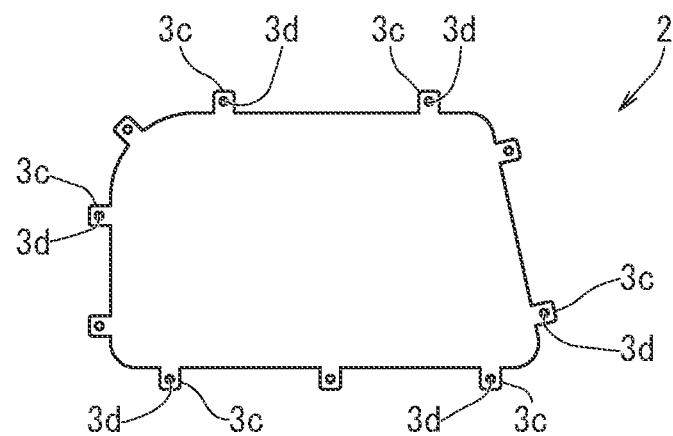
FIG. 2 is a descriptive view illustrating a first member with a trimmed outer periphery.

The composite molded article 1 is manufactured in such a manner that first, a flat plate-like base member (nonwoven fabric herein) which is softened under heating is cut into a shape corresponding to the outer shape of the first molded portion 3 to form the first member 2, as illustrated in FIG. 2. At this time, the first member 2 is formed into a shape when the stereoscopic first molded portion 3 is developed on a plane because the first molded portion 3 has a stereoscopic shape. Furthermore, the tabs 3c extending outward from the peripheral edge and the through-holes 3d are formed on the first member 2. The tabs 3c and the through-holes 3d are provided at positions corresponding to the tab accommodation grooves 16 and the positioning pins 17 of the back mold 12.

In a state where the molding mold 10 is opened, the flat plate-like first member 2 softened under heating by a heater of a predetermined temperature (for example, 160° C. to 230° C.) is positioned between the front mold 11 and the back mold 12 and arranged in a part of the portion where the molding space 13 is formed. To be specific, the first member 2 is placed in a region for forming the first molded portion 3, which is surrounded by the joining portion formation groove 14 of the back mold 12, in a region of the molding mold 10 where the molding space 13 is formed. At this time, the tabs 3c of the first member 2 are inserted into the corresponding tab accommodation grooves 16, and the positioning pins 17 are inserted through the through-holes 3d. The positioning bushes 7 with the flange portions 7b facing upward are fitted into the through-holes 3d and the positioning pins 17 from above the tabs 3c, and the tabs 3c are pressed against the bottom portions of the tab accommodation grooves 16 by the flange portions 7b for fixing (see FIGS. 5B and 5C). The tabs 3c are compressed to be thinner than the other portions at this time.

In this manner, the tabs 3c are inserted into the tab accommodation grooves 16 and are fixed by the positioning bushes 7, so that the first member 2 is positioned at a fixed position on the back mold 12. In this state, the peripheral edge of the first member 2 is located above the joining portion formation groove 14. Then, after the front mold 11 is lowered and mold closing is started, injection, from the gate, of the molten resin at a higher temperature (for example, 180° C. to 300° C.) than that of the first member 2 into the remaining portion of the molding space 13 on the outer side of the joining portion formation groove 14 is started.

The first member 2 is pressed against the back mold 12 by the front mold 11 with mold closing, and the first member 2 is formed into the same shape as the molding space 13, so that the stereoscopic first molded portion 3 is formed. At this time, the first member 2 is cooled and solidified because the usage temperature of the molding mold 10 is set to 35° C. to 45° C. When the weir portion 15 of the front mold 11 abuts against the first member 2 by the mold closing, the peripheral edge of the first member 2 is bent to the joining portion formation groove 14 at the lower side to form the first joining piece 3a, and the root portion of the first joining piece 3a is compressed rather than the other portions to form the thin portion 3b. The weir portion 15 is thereby made into a state of abutting against the thin portion 3b. When the weir portion 15 presses the peripheral edge of the first member 2 into the joining portion formation groove 14, the peripheral edge of the first member 2 is compressed and the first joining piece 3a becomes thinner than the other portions.

The molten resin injected from the gate expands while flowing in the molding space 13 on the outer side of the joining portion formation groove 14. The molten resin that has reached the joining portion formation groove 14 makes contact with a portion of the first joining piece 3a of the first member 2 on the front end side of the thin portion 3b. On the other hand, the molten resin does not make contact with an inner portion of the first member 2 inside from the thin portion 3b with presence of the weir portion 15 of the front mold 11, which abuts against the thin portion 3b.

The molten resin that has made contact with the portion of the first joining piece 3a on the front end side of the thin portion 3b permeates into that portion. Note that the thin portion 3b is formed by compressing the first member 2 and is therefore increased in density. The molten resin does not therefore permeate to the inner side of the first member 2 beyond the thin portion 3b. Accordingly, the molten resin does not ooze out to the surface of the first member 2.

Furthermore, also at the sites of the tabs 3c in the first member 2, the weir portion 15 of the front mold 11 abuts against a portion of the first member 2 on the inner side from the roots of the tabs 3c, and a part of the first joining piece 3a is formed and the thin portion 3b is formed. Then, when the molten resin reaches sites above the tabs 3c in the molding space 13, the molten resin makes contact with the surfaces of the tabs 3c and permeates the tabs 3c. Similarly to the above description, the thin portion 3b and the weir portion 15 prevents the molten resin from permeating to the inner side from the thin portion 3b in the first member 2.

At this time, the tabs 3c do not go up from the bottom portions of the tab accommodation grooves 16 because the flange portions 7b of the positioning bushes 7 with the cylindrical portions 7a fitted with the positioning pins 17 through the through-holes 3d abut against the surfaces of the tabs 3c. Accordingly, the tabs 3c do not appear on the front surface of the second molded portion 4.

Then, after the molding mold 10 is completely closed and the temperature of the molten resin filling the molding space 13 is hardened to some extent, the molding mold 10 is opened for demolding, and then, the second molded portion 4 is completely hardened, thereby completing the composite molded article 1.

In this case, since the second molded portion 4 is formed later than the first molded portion 3, compression stress acts from the surrounding on the first molded portion 3 formed first with contraction of the second molded portion 4 by hardening of the molten resin, so that residual stress is generated on the first molded portion 3.

As described above, the method for manufacturing the composite molded article 1 in the embodiment includes forming the first molded portion 3 by cold-press molding and forming the second molded portion 4 by injection molding, and is therefore a novel manufacturing method in which different molding methods are combined.

Although in the above description, the molten resin is injected before the molding mold 10 is completely closed as the example, the molten resin may be injected after the molding mold 10 is completely closed.

According to the embodiment, the first molded portion 3 formed by the first member 2 which is softened under heating and the second molded portion 4 made of the resin which is molten are integrally molded simultaneously in one molding mold 10. An operator is not therefore required to assemble the first molded portion 3 and the second molded portion 4 that are separately molded. Accordingly, time taken for manufacturing can be shortened, and increase in manufacturing cost can be suppressed.

Moreover, according to the embodiment, the thin portion 3b and the weir portion 15 can prevent the molten resin and the heat of the molten resin from influencing the first molded portion 3. This can avoid deterioration in outer appearance, which is caused by the resin of the second molded portion 4 that appears on the front surface of the first molded portion 3 or change of the first molded portion 3 due to the heat of the molten resin. The composite molded article 1 with high decorativeness can thereby be manufactured.

Furthermore, according to the embodiment, the weir portion 15 of the front mold 11 and the joining portion formation groove 14 of the back mold 12 are provided in the annular forms along the peripheral edge of the first molded portion 3. The joining portion 5 where the first molded portion 3 and the second molded portion 4 are joined to each other is thereby formed into an annular form. That is to say, the first molded portion 3 and the second molded portion 4 are joined over the entire length of the portion where the first molded portion 3 and the second molded portion 4 are in contact with each other. With this configuration, the first molded portion 3 and the second molded portion 4 can thereby be firmly joined in comparison with the case where a skin material is mounted on an interior material main body at places by extension portions as in a conventional article, thereby manufacturing the composite molded article 1 with high strength and rigidity.

In addition, according to the embodiment, residual stress is generated on the first molded portion 3 with contraction of the second molded portion 4 in manufacturing. Therefore, even when force acts on the composite molded article 1, the residual stress of the first molded portion 3 can cancel such force to some extent, thereby manufacturing the composite molded article 1 that is hardly damaged.

Furthermore, according to the embodiment, the molten resin is injected to the surrounding of the first molded portion 3 to mold the second molded portion 4, and the second molded portion 4 is not present on the back surface of the first molded portion 3. Accordingly, as compared to a conventional article in which resin is present on the back surface of a skin material or a decorative material corresponding to the first member 2, the composite molded article 1 further reduced in weight can be manufactured, and the amount of resin to be used can be reduced for the size of the composite molded article 1 to suppress increase in cost for manufacturing the composite molded article 1.

Moreover, according to the embodiment, the first molded portion 3 with the back surface on which no second molded portion 4 is present is formed by the nonwoven fabric. Therefore, when the composite molded article 1 is used for an interior material of a vehicle, sound in the vehicle can be made to escape to the vehicle body side through the first molded portion 3, thereby reducing noise in the vehicle.

In addition, according to the embodiment, the plurality of tabs 3c are provided on the first member 2, and the tabs 3c are positioned to the back mold 12. The first member 2 can therefore be positioned to the molding mold 10 with the plurality of tabs 3c reliably. Furthermore, the tabs 3c extending to the second molded portion 4 side are positioned to the back mold 12, and a part of the molding space 13 is formed between the tabs 3c and the front mold 11. Accordingly, the molding space 13 is filled with the molten resin to prevent the tabs 3c from appearing on the front surface of the second molded portion 4, and the outer appearance of the composite molded article 1 is not deteriorated. That is to say, the composite molded article 1 with high decorativeness and preferable outer appearance can be provided.

Moreover, according to the embodiment, as a configuration for positioning the tabs 3c of the first member 2 to the back mold 12, the tab accommodation grooves 16 are provided and the positioning pins 17 projecting from the bottom portions thereof are provided on the back mold 12. This configuration is relatively simple, so that increase in cost for the molding mold 10 can be suppressed. In addition, according to the embodiment, the positioning bushes 7 made of the synthetic resin are used for positioning of the tabs 3c of the first member 2. The positioning bushes 7 are relatively inexpensive, so that increase in cost for manufacturing can be suppressed.

Hereinbefore, the present invention has been explained using the preferred embodiment. The present invention is not however limited to the above-described embodiment, and various improvements and changes in design can be made in a range without departing from the aspect of the present invention. Hereinafter, the same reference numerals denote the same components as those in the above description, and overlapped explanation thereof is omitted.

For example, the nonwoven fabric containing the thermoplastic fiber is used as the first member 2 in the above-described embodiment. The first member 2 is however not limited thereto, and a nonwoven fabric impregnated with thermoplastic resin, foamed resin such as urethan foam, the above-described nonwoven fabric or foamed resin having a surface to which a resin sheet with a woodgrain pattern or a leather pattern applied is bonded, or the like may be used therefor.

Figure 6A:
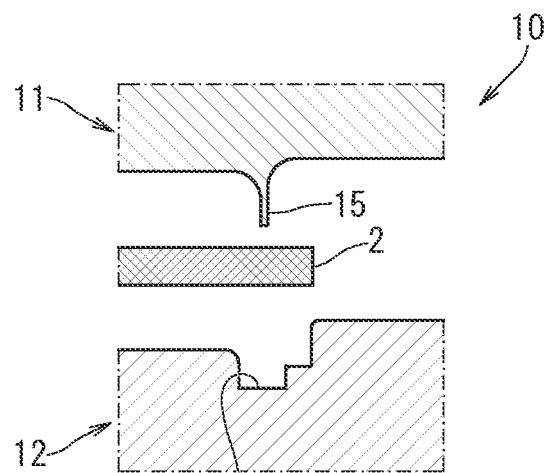
FIGS. 6A to 6C are descriptive views illustrating the joining portion in a different form from that in FIGS. 1A to 1D together with the manufacturing process.
Figure 6B:
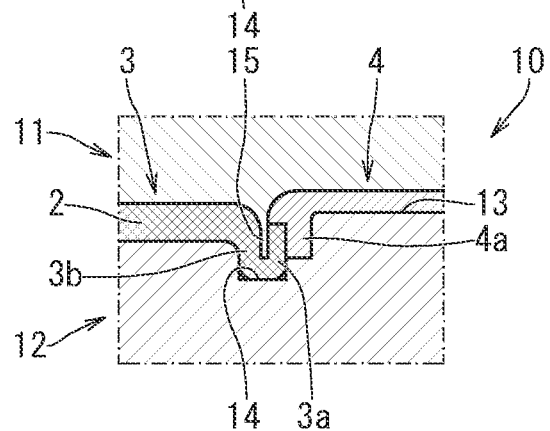
Figure 6C:
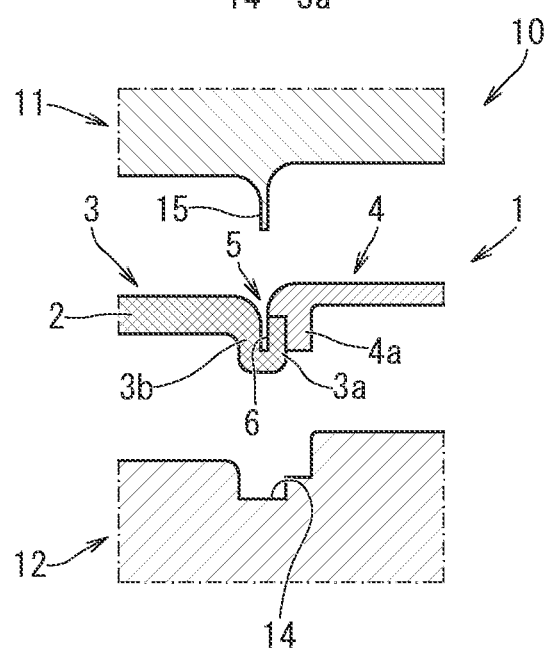

Furthermore, in the joining portion 5 between the first molded portion 3 and the second molded portion 4, the peripheral edges thereof are bent to the back side, and they are joined to each other at the deeper position than the bottom of the groove 6 in the above-described embodiment. They are not however limited to be joined thereat and may be joined at a shallower position than the bottom of the groove 6, as illustrated in FIGS. 6A to 6C. In the joining portion 5 in FIGS. 6A to 6C, the weir portion 15 of the front mold 11 and the joining portion formation groove 14 of the back mold 12 form the first joining piece 3a that is bent so as to project to the back side in a U-shaped form at the peripheral edge of the first molded portion 3 (first member 2), and the second joining piece 4a of the second molded portion 4 is joined to the front end side of one of two parallel sides of the U shape of the first joining piece 3a, which is farther from the center of the first molded portion 3.

The embodiment illustrated in FIGS. 6A to 6C can also provide similar action and effects to those in the above description. In addition, since the first molded portion 3 and the second molded portion 4 are joined to each other at the shallower position than the bottom of the groove 6, the projecting length of the joining portion 5 to the back side can be shortened. Accordingly, the composite molded article 1 in which the joining portion 5 hardly obstacles mounting on a mounting target such as a vehicle can be provided.

The tabs 3c are positioned into the tab accommodation grooves 16 of the back mold 12 using the positioning bushes 7 in the above-described embodiment. The tabs 3c are not however limited to be positioned in this manner and may be positioned using fasteners 30 as illustrated in FIGS. 7A to 7E. In an example of FIGS. 7A to 7E, positioning holes 18 for mounting the fasteners 30 are provided in the bottom portions of the tab accommodation grooves 16 of the back mold 12. Each fastener 30 is configured by a cylindrical grommet 31 and a pin 32. The cylindrical grommet 31 has a plurality of expandable leg portions 31a. The pin 32 has a flat plate-like pusher 32a and its front end is inserted into the grommet 31. In the embodiment, when the pushers 32a of the pins 32 are pressed in a state where the grommets 31 of the fasteners 30 are inserted into the positioning holes 18 of the back mold 12 through the through-holes 3d of the tabs 3c (see FIG. 7B), the tabs 3c are pressed and compressed against the bottom portions of the tab accommodation grooves 16 by the pushers 32a, and the leg portions 31a of the grommets 31 are expanded by the pin 32 to abut against the positioning holes 18. The tabs 3c can thereby be positioned (see FIG. 7C).

Figure 7A:
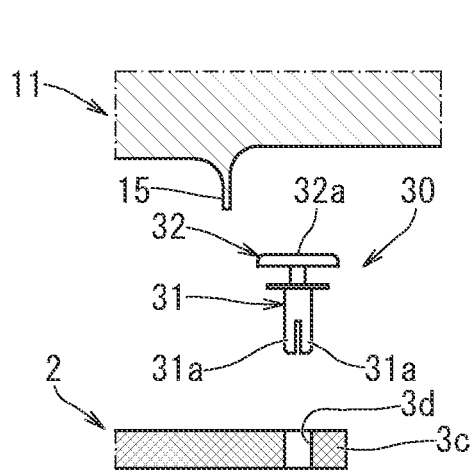
FIGS. 7A to 7E are descriptive views illustrating positioning of the tabs in a different form from that in FIGS. 1A to 1D together with the manufacturing process.
Figure 7D:
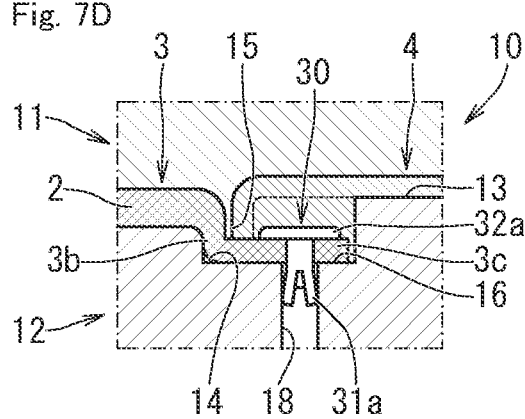
Figure 7B:
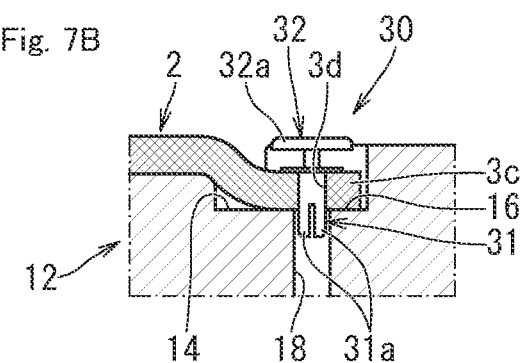
Figure 7E:
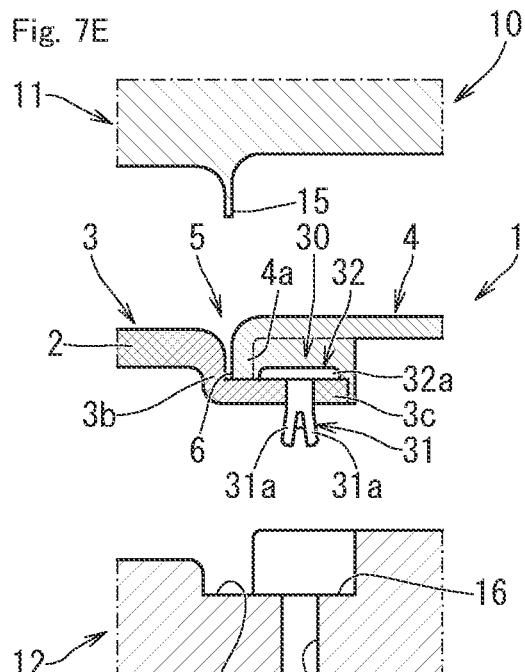
Figure 7C:
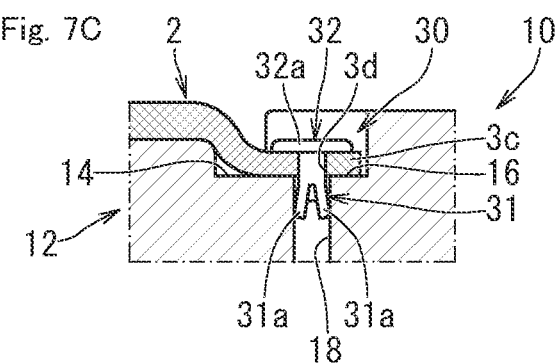

The embodiment illustrated in FIGS. 7A to 7E can also provide similar action and effects to those in the above description. Furthermore, in the embodiment, as illustrated in FIG. 7E, the fasteners 30 are buried in the composite molded article 1, and portions of the fasteners 30, which project to the back side from the tabs 3c, may be removed after demolding from the molding mold 10.

The tabs 3c are positioned into the tab accommodation grooves 16 of the back mold 12 using the positioning bushes 7 or the fasteners 30 in the above-described embodiment. The tabs 3c are not however limited to be positioned in this manner and may be positioned using clamps 35 as illustrated in FIGS. 8A to 8D. The clamps 35 are formed to have such sizes that spaces accommodating the tabs 3c in compressed states can be formed between the lower surfaces thereof and the bottom portions of the tab accommodation grooves 16 when the clamps 35 are fitted into the tab accommodation grooves 16. The clamps 35 are made of metal that is the same as that forming the molding mold 10.

In the embodiment, the diameters of the positioning pins 17 projecting from the bottom portions of the tab accommodation grooves 16 are the same as the diameters of the through-holes 3d of the tabs 3c. Accordingly, when the positioning pins 17 are fitted into the through-holes 3d of the tabs 3c, the tabs 3c (first member 2) are positioned. Then, the clamps 35 are fitted into the tab accommodation grooves 16 from above and press and compress the tabs 3c to cause the upper surfaces of the clamps 35 to coincide with the upper surface of the back mold 12 (see FIG. 8B).

The molding space 13 having the same thickness as that of the other portion of the second molded portion 4 is formed above the clamps 35. Subsequently, the first molded portion 3 is formed by mold closing of the molding mold 10, the second molded portion 4 is formed by injection of the molten resin, and the mold opening is performed for demolding. Thereafter, the clamps 35 are detached from between the tabs 3c and the second molded portion 4, thereby completing the composite molded article 1 (see FIG. 8D).

The embodiment illustrated in FIGS. 8A to 8D can also provide similar action and effects to those in the above description. In addition, the thickness of the portions of the second molded portion 4, which correspond to sites where the tabs 3c are provided, can be set to that of the other portion. Therefore, generation of sinks due to hardening of the molten resin on the surfaces of the portions can be suppressed, so that the composite molded article 1 with preferable outer appearance can be provided. Since the tabs 3c are not joined to the second molded portion 4 in the composite molded article 1, the tabs 3c may be removed after demolding. Although the clamps 35 are separated from the molding mold 10 herein, the configuration is not limited thereto and the clamps 35 may be opened and closed by inclined pin mechanisms, hydraulic cylinders, or the like.

Furthermore, in the above-described embodiment, the tabs 3c are positioned to the tab accommodation grooves 16 of the back mold 12 using the through-holes 3d in the punched form, which are provided in the tabs 3c of the first member 2. The tabs 3c are not however limited to be positioned in this manner and may be positioned by providing notches 3e in the tabs 3c, as illustrated in FIG. 9A. To be specific, the notches 3e that linearly extend in the direction orthogonal to the peripheral edge of the first member 2 are provided in the tabs 3c of the first member 2.

On the other hand, movable pins 40 each having, at the upper end thereof, a hook portion 41 the cross-sectional shape of which is an L shape are provided at sites of the tab accommodation grooves 16 on the back mold 12 of the molding mold 10. The movable pins 40 are provided so as to be moved up and down and rotate with drive mechanisms (not illustrated). Although not illustrated in the drawings, the movable pins 40 have columnar shapes. The back mold 12 includes a cover portion 19 extending toward the movable pins 40 on the same plane as the upper surface of the back mold 12 above portions of the tab accommodation grooves 16 on the side of the center of the second molded portion 4 relative to the movable pins 40. Spaces between the bottom portions of the tab accommodation grooves 16 and the cover portion 19 are formed to have such heights that the first member 2 (tabs 3c) can be inserted thereinto.

In the embodiment of FIGS. 9A to 9G, when the first member 2 is positioned to the opened molding mold 10, as illustrated in FIG. 9B, the movable pins 40 are moved up to cause the hook portions 41 to be located above the upper surface (surface for forming the back surface of the second molded portion 4) of the back mold 12 and the openings of the hook portions 41 are made to face the direction farther from the joining portion formation groove 14. In this state, the movable pins 40 are inserted through the notches 3e of the tabs 3c to cause the tabs 3c to be locked by the hook portions 41 (see FIG. 9C). Then, the movable pins 40 are moved down to cause the upper surfaces of the movable pins 40 to coincide with the upper surface of the cover portion 19 (see FIG. 9D). In this state, the tabs 3c abut against the bottom portions of the tab accommodation grooves 16 to be compressed.

Subsequently, when the movable pins 40 are caused to rotate by 180 degrees about the axial cores thereof, the openings of the hook portions 41 face the direction of the joining portion formation groove 14, the tabs 3c are pulled in the direction of being farther from the joining portion formation groove 14 through the notches 3e by vertically extending portions of the L-shaped hook portions 41, and the front ends of the tabs 3c are inserted into between the bottom portions of the tab accommodation grooves 16 and the cover portion 19 (see FIG. 9E). The tabs 3c are thereby positioned and are made into states of being incapable of going up from the bottom portions of the tab accommodation grooves 16.

Thereafter, the molding mold 10 is closed to form the first molded portion 3, and the molten resin is injected into the molding space 13 to form the second molded portion 4. Then, the mold opening is performed, the movable pins 40 are moved up, and demolding is performed to cause the hook portions 41 to be disengaged from the notches 3e of the tabs 3c, thereby completing the composite molded article 1 (see FIG. 9G). In demolding, the movable pins 40 may be moved up after being caused to rotate by 180 degrees about the axial cores thereof.

The embodiment illustrated in FIGS. 9A to 9G can also provide similar action and effects to those in the above description. In addition, the thickness of the portions of the second molded portion 4, which correspond to the sites where the tabs 3c are provided, can be set to that of the other portion. Therefore, generation of sinks due to hardening of the molten resin on the surfaces of the portions can be suppressed, so that the composite molded article 1 with preferable outer appearance can be provided. Also in the embodiment, similarly to the embodiment of FIGS. 8A to 8D, since the tabs 3c are not joined to the second molded portion 4 in the composite molded article 1, the tabs 3c may be removed after demolding.

Furthermore, in the joining portion 5 between the first molded portion 3 and the second molded portion 4, they are joined to each other in the state where the peripheral edges thereof are bent to the back side, in the above-described embodiment. The configuration is however not limited thereto, and they may be joined in a state where they are not bent to the back side in the joining portion 5, as illustrated in FIGS. 10A to 10O and FIGS. 11A to 11C. In the embodiments of FIGS. 10A to 10O and FIGS. 11A to 11C, when the flat plate-like base member is cut to form the first member 2, the front end side including a portion where the groove 6 is formed in the composite molded article 1 is compressed to form a thin plate portion 3f.

Figure 10A:
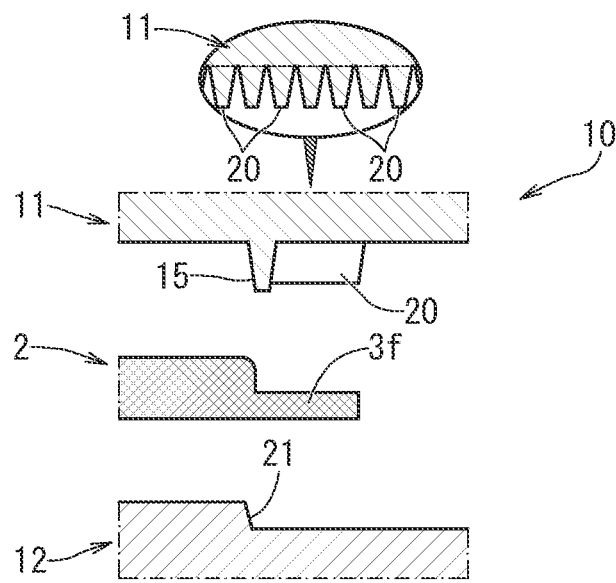
FIGS. 10A to 10O are descriptive views illustrating the joining portion in a further different form together with the manufacturing process.

First, in the embodiment of FIGS. 10A to 10O, auxiliary pieces 20 extending downward in flat plate forms are provided on the front mold 11 of the molding mold 10 on the side on which the surface of the second molded portion 4 is formed relative to the weir portion 15. The plurality of auxiliary pieces 20 are provided with intervals along the weir portion 15. The auxiliary pieces 20 extend downward shorter than the weir portion 15. On the other hand, a step 21 is formed on the back mold 12 of the molding mold 10 between a surface for forming the back surface of the first molded portion 3 and a surface for forming the back surface of the second molded portion 4 such that the surface for forming the back surface of the first molded portion 3 is higher than the surface for forming the back surface of the second molded portion 4. The step 21 is provided on the first molded portion 3 side from the weir portion 15. In the embodiment, the joining portion formation groove 14 is not provided in the back mold 12.

In the embodiment of FIGS. 10A to 10O, the first member 2 is positioned on the back mold 12 such that the base end of the thin plate portion 3f is located below the weir portion 15, and the molding mold 10 is closed. At this time, the first member 2 is pressed to cause the back surface thereof to be formed into a shape along the surface of the back mold 12, and the weir portion 15 presses a part of the thin plate portion 3f to form the thin portion 3b. The plurality of auxiliary pieces 20 of the front mold 11 abut against the thin plate portion 3f. Then, the molten resin injected into the molding space 13 makes contact with the front end of the thin plate portion 3f and enters spaces between the auxiliary pieces 20 to make contact with the surface of the thin plate portion 3f, so that it is joined to the first molded portion 3. In this case, the plurality of auxiliary pieces 20 abut against the upper surface of the thin plate portion 3f, and the thin plate portion 3f does not therefore go up even when the molten resin makes contact therewith. The thin portion 3b and the weir portion 15 prevent the molten resin from oozing out to the surface of the first member 2 beyond the thin portion 3b.

Thereafter, the molding mold 10 is opened for demolding, thereby completing the composite molded article 1. In the composite molded article 1, the first molded portion 3 is formed to be thinner than the second molded portion 4, and the plurality of auxiliary pieces 20 provided on the front mold 11 form parting portions 4b of the second molded portion 4 outside the groove 6.

In the embodiment of FIG. 10A to 10O, the step 21 is provided on the portion of the back mold 12 of the molding mold 10, which corresponds to the joining portion 5. The configuration is not however limited thereto, and the surface for forming the back surface of the first molded portion 3 and the surface for forming the back surface of the second molded portion 4 may be on the same plane in the portion on the back mold 12, which corresponds to the joining portion 5, as illustrated in FIGS. 11A to 11C.

Figure 11A:
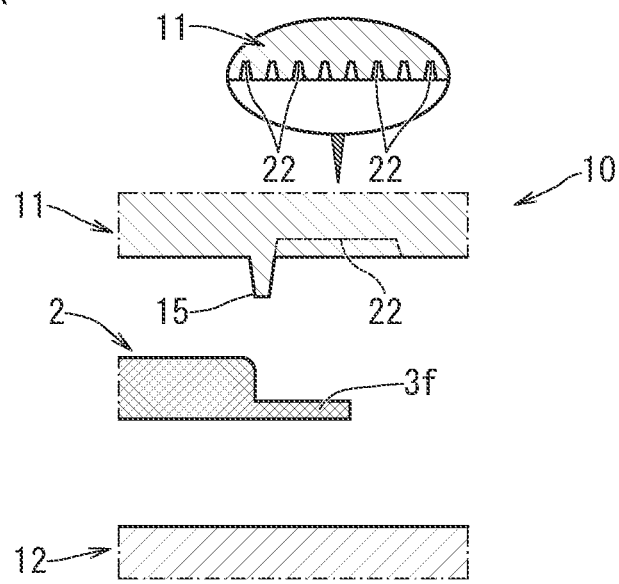
FIGS. 11A to 11C are descriptive views illustrating the joining portion in another different form together with the manufacturing process.
Figure 11B:
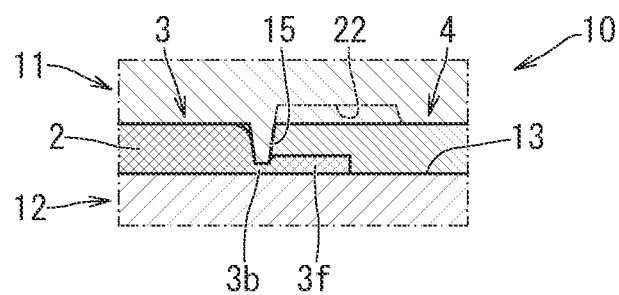
Figure 11C:
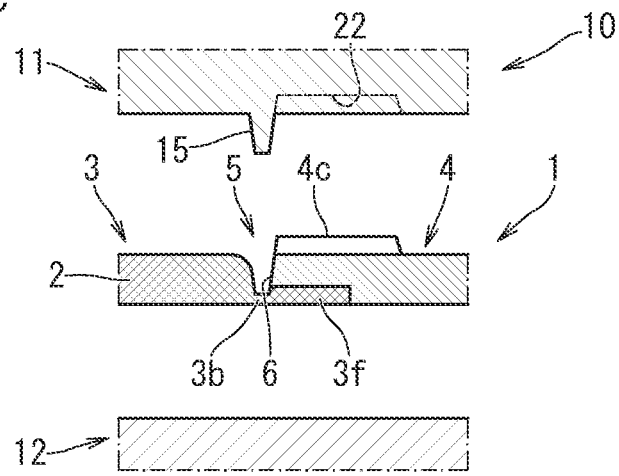

In the embodiment of FIGS. 11A to 11C, auxiliary grooves 22 recessed upward in flat plate forms from the surface for forming the front surface of the second molded portion 4 are provided on the front mold 11 of the molding mold 10 on the second molded portion 4 side from the weir portion 15. The plurality of auxiliary grooves 22 are provided with intervals along the weir portion 15. The depths of the auxiliary grooves 22 are the same as the thickness of the thin plate portion 3f of the first member 2. The back mold 12 of the molding mold 10 is formed on the same continuous plane with no groove and no step in the portion corresponding to the joining portion 5.

Figure 10B:
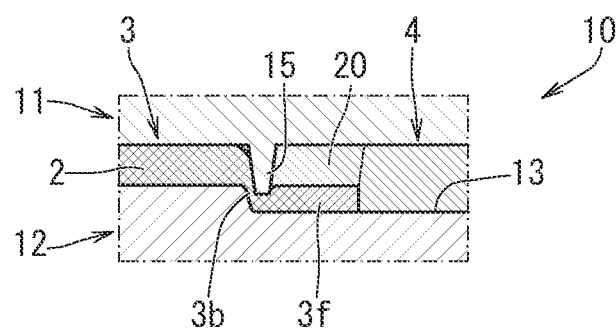
Figure 10C:
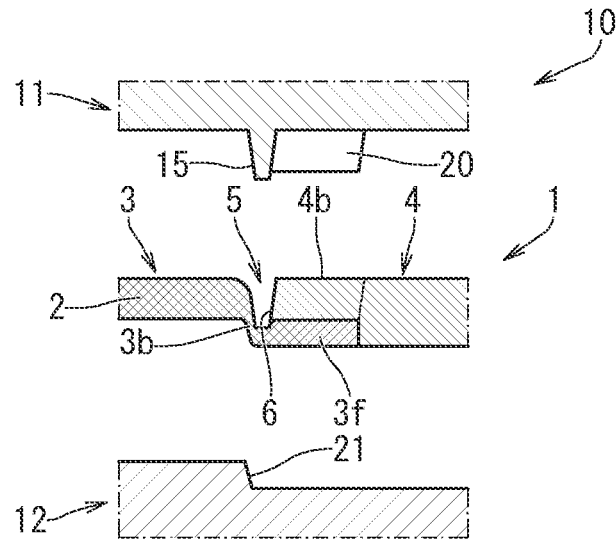

Also in the embodiment of FIGS. 11A to 11C, the first member 2 is positioned on the back mold 12 such that the base end of the thin plate portion 3f is located below the weir portion 15, similarly to the embodiment of FIGS. 10A to 10C. When the molding mold 10 is closed, the weir portion 15 of the front mold 11 abuts against the thin plate portion 3f, and the molten resin injected into the molding space 13 makes contact with the front end and the surface of the thin plate portion 3f. At this time, the weir portion 15 presses the thin plate portion 3f downward to form the thin portion 3b. The molten resin is thereby prevented from oozing out to the surface of the first member 2 beyond the thin portion 3b. Furthermore, since the thin plate portion 3f is formed by compressing the first member 2, it has rigidity and is not easily bent. Therefore, the thin plate portion 3f does not go up from the back mold 12 even when the molten resin makes contact therewith. The molten resin injected into the molding space 13 also enters the auxiliary grooves 22 in the front mold 11.

Thereafter, the molding mold 10 is opened for demolding, thereby completing the composite molded article 1. In the composite molded article 1, the first molded portion 3 and the second molded portion 4 are formed to have the same thickness, and the plurality of auxiliary grooves 22 provided in the front mold 11 form parting portions 4c projecting from the surface of the second molded portion 4 outside the groove 6.

As described above, the embodiments of FIGS. 10A to 10C and FIGS. 11A to 11C can also provide similar action and effects to those in the above description. In addition, the first molded portion 3 and the second molded portion 4 are not bent so as to project to the back side in the joining portion 5, and the back surfaces thereof in the joining portion 5 are formed on the same plane. The composite molded article 1 that is entirely uniform in thickness can thereby be provided.

Furthermore, according to the embodiment, the parting portion 4b or the parting portion 4c with irregularities is provided on the second molded portion 4 outside the groove 6. Therefore, the parting portion 4b or the parting portion 4c can accentuate the front surface of the composite molded article 1 to increase the decorativeness. In addition, even when the position of the peripheral edge of the first member 2 deviates in manufacturing, it can be made less noticeable, so that the composite molded article 1 with preferable outer appearance can be provided.

Figure 12A:
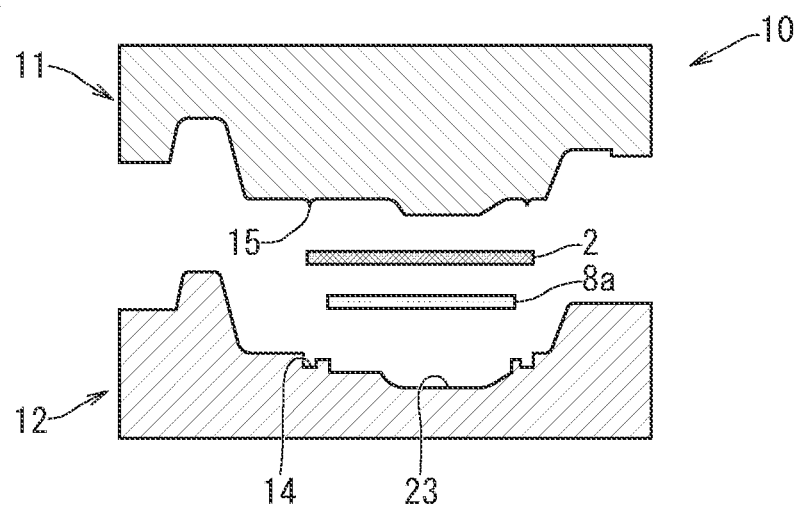
FIG. 12A to 12C is a descriptive view illustrating a composite molded article different from that in FIGS. 1A to 1D together with the manufacturing process.
Figure 12B:
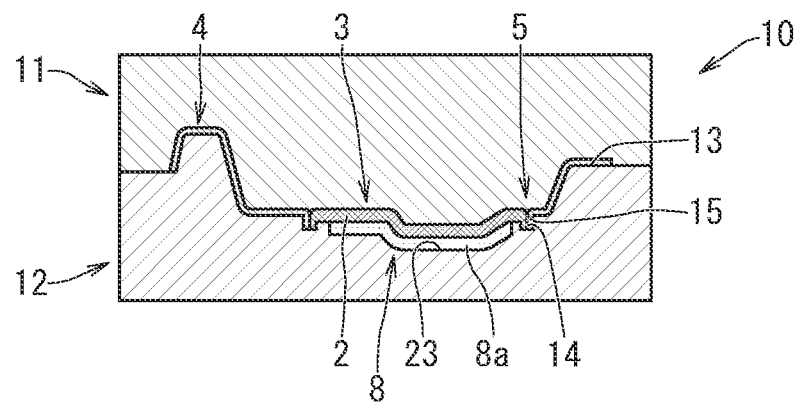
Figure 12C:
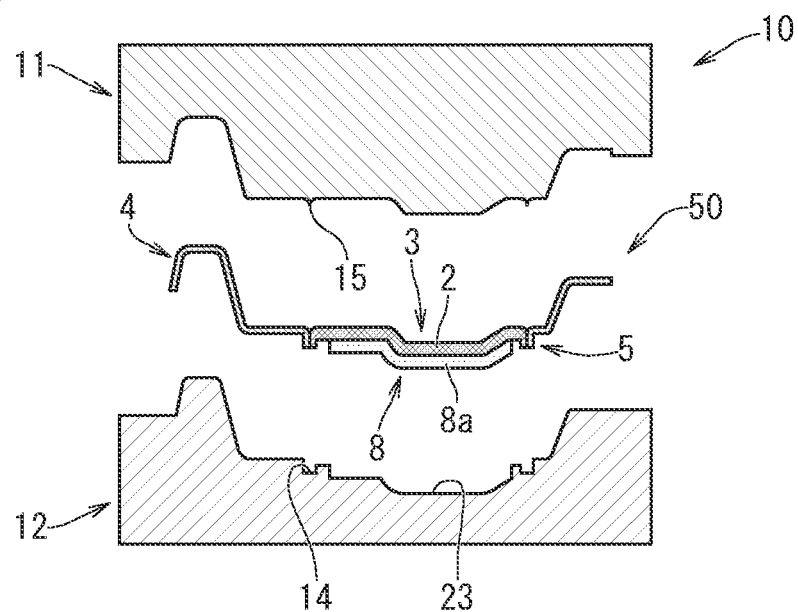

Moreover, in the above-described embodiment, the composite molded article 1 in which nothing is provided on the back surface of the first molded portion 3 is described. The composite molded article 1 is not however limited thereto, and a composite molded article 50 in which a third molded portion 8 is provided on the back surface of the first molded portion 3 may be configured, as illustrated in FIGS. 12A to 12C. In the embodiment, a third molding surface 23 for forming the third molded portion 8 is formed on the back mold 12 of the molding mold 10.

The third molded portion 8 of the composite molded article 50 is stereoscopically formed simultaneously with the first molded portion 3 by arranging a flat plate-like third member 8a made of foamed resin such as urethan foam, which has been softened under heating, on the third molding surface 23 of the back mold 12 of the opened molding mold 10, arranging the first member 2 heated similarly to the above description above the third member 8a, and performing mold closing.

According to the embodiment of FIGS. 12A to 12C, the composite molded article 50 having different soundproof performance and heat insulating performance can be easily provided by selecting the thickness and/or the material of the third molded portion 8.

In the embodiment of FIGS. 12A to 12C, the third member 8a softened under heating forms the third molded portion 8. The third molded portion 8 is not however limited to be formed in this manner and may be formed in the following manner. That is, when the first molded portion 3 is formed by closing the molding mold 10, foamed resin is supplied to between the first member 2 and the back mold 12, the first member 2 is pressed against the front mold 11 with pressure of the foamed resin to form the first molded portion 3, and the foamed resin is hardened to form the third molded portion 8.

In the above-described embodiment, the composite molded article 1 in which the second molded portion 4 is integrally molded so as to surround the entire periphery of the first molded portion 3. The composite molded article 1 is not however limited thereto, and a composite molded article in which the second molded portion 4 is integrally formed so as to surround the periphery of the first molded portion 3 in a U-shaped form or an L-shaped form.

What is claimed is:

1. A method for manufacturing a composite molded article in which a first molded portion formed by a flat plate-like first member which is softened under heating and a second molded portion formed by hardening molten resin are integrally molded, the method comprising:
   opening a molding mold that forms a molding space by mold closing and has a weir portion projecting into the molding space,
   arranging the flat plate-like first member softened under heating in a part of a portion where the molding space is formed,
   forming the first molded portion that is stereoscopic with the mold closing,
   simultaneously filling an injected molten resin in a remaining portion of the molding space around the first member outside the weir portion in a state that the weir portion is made to abut against a thin portion reduced in thickness and provided at a peripheral edge of the first molded portion, and
   forming the second molded portion that is joined to the first molded portion by hardening molten resin after the resin is caused to contact the first molded portion,
   wherein the thin portion is a portion formed by compressing the first member and has a higher density than that of portions other than the thin portion in the first molded portion.

2. The method for manufacturing the composite molded article according to claim 1,
   wherein the molding mold includes a front mold for forming a front surface of the composite molded article and a back mold for forming a back surface of the composite molded article,
   the first member has a plurality of tabs extending to a region where the second molded portion is formed,
   each of the plurality of tabs has a through-hole,
   the back mold has positioning pins projecting upward, and
   the mold closing is performed in a state where the tabs are positioned to the back mold, by the positioning pins inserted through the through-holes respectively, such that a part of the molding space is formed between the tabs and the front mold.

3. A composite molded article comprising:
a first molded portion that has a thin portion reduced in thickness at a peripheral edge and is stereoscopically formed by a first member which is softened under heating, and
a second molded portion that is joined to the first molded portion on an outer side of the thin portion, is provided around the first molded portion, and is formed by hardening molten resin,
wherein the thin portion is a portion formed by compressing the first member and has a higher density than that of portions other than the thin portion in the first molded portion.

4. The composite molded article according to claim 3,
wherein the first molded portion has a plurality of tabs in a portion where it is joined to the second molded portion,
each of the plurality of tabs has a through-hole, and
the through-holes are not fulfilled by resin.

* * * * *